(12) United States Patent
Bar

(10) Patent No.: US 7,979,885 B2
(45) Date of Patent: Jul. 12, 2011

(54) REAL TIME BIT RATE SWITCHING FOR INTERNET PROTOCOL TELEVISION

(75) Inventor: Shahar Bar, Pleasanton, CA (US)

(73) Assignee: Harmonic Inc., Sunnyvale, CA (US)

(*) Notice: Subject to any disclaimer, the term of this patent is extended or adjusted under 35 U.S.C. 154(b) by 824 days.

(21) Appl. No.: 11/203,068

(22) Filed: Aug. 11, 2005

(65) Prior Publication Data

US 2007/0039028 A1 Feb. 15, 2007

(51) Int. Cl.
H04N 7/173 (2006.01)

(52) U.S. Cl. ........................ 725/119; 725/116

(58) Field of Classification Search .................. 725/105, 725/63, 67, 86, 87, 91–93, 98, 88, 90, 118, 725/119, 126, 129
See application file for complete search history.

(56) References Cited

U.S. PATENT DOCUMENTS

| | | | | |
|---|---|---|---|---|
| 4,302,775 | A * | 11/1981 | Widergren et al. | 375/240.06 |
| 5,719,786 | A * | 2/1998 | Nelson et al. | 709/219 |
| 6,014,694 | A * | 1/2000 | Aharoni et al. | 709/219 |
| 6,529,146 | B1 | 3/2003 | Kowalski et al. | |
| 6,859,496 | B1 | 2/2005 | Boroczky et al. | |
| 2002/0023165 | A1* | 2/2002 | Lahr | 709/231 |
| 2002/0152317 | A1 | 10/2002 | Wang et al. | |
| 2002/0157102 | A1* | 10/2002 | Lee et al. | 725/93 |
| 2003/0135863 | A1* | 7/2003 | Van Der Schaar | 725/95 |
| 2004/0103189 | A1* | 5/2004 | Cherkasova et al. | 709/224 |
| 2005/0246751 | A1* | 11/2005 | Boyce et al. | 725/101 |

FOREIGN PATENT DOCUMENTS

| | | |
|---|---|---|
| EP | 1 233 622 | 8/2002 |
| WO | WO03/065683 | 8/2003 |
| WO | WO2004/025405 | 3/2004 |

OTHER PUBLICATIONS

PCT International Search Report of Mar. 30, 2007 (PCT/US06/31192), 2 pages.
Examination Report in European Application No. 06801138.6, dated Sep. 14, 2009.
Int'l Preliminary Report on Patentability in Application No. PCT/US2006/031192, dated Feb. 12, 2008.

* cited by examiner

Primary Examiner — Andrew Y Koenig
Assistant Examiner — Jason M Thomas
(74) Attorney, Agent, or Firm — Fish & Richardson P.C.

(57) ABSTRACT

A method, apparatus and computer program product are provided for delivering television programming to a subscriber. In one aspect the method includes receiving one or more channels of program content, and encoding each channel a plurality of times, each time at a different rate producing multiple rate encoded signals for each channel. The method can further include transmitting the multiple rate encoded signals to a central office over a network, determining an available bandwidth of a downstream link to a subscriber and a current bit rate available for transmission to the subscriber. The method can further include selecting a best available bit rate from the multiple rate encoded signals for a requested channel and transmitting the selected rate encoded signal to the subscriber.

20 Claims, 3 Drawing Sheets

REAL TIME BIT RATE SWITCHING FOR INTERNET PROTOCOL TELEVISION

BACKGROUND

The following disclosure relates to network communication.

Delivery of broadcast television signals has advanced over the years from classical over-air delivery channels to cable, satellite, and telephone delivery systems. As the delivery mechanisms have changed, so have the challenges in delivering the content efficiently to the consumers. Delivery of the content is constrained by resources of the delivery systems including bandwidth limitations of the communication channels used. As content has expanded to include pay-per-view services, digital music and a myriad of new channel offerings, the challenges to the delivery systems to provide such content efficiently have grown. Relatively recently, additional system level pressure has been added due to the demand from the consumer for higher quality content delivery (e.g., high definition television, HDTV).

Most delivery systems have inherent bandwidth limitations that limit the amount of content that can be delivered. The bandwidth limitations can be resource dependent or channel dependent, in that limitations may exist in each end of the delivery system at a transmit or receive side (e.g., finite amount of data that is able to be transmitted or received by the transmitting or receiving devices), or in the communication channel itself (e.g., bandwidth at a given frequency for broadcast, or downlink bandwidth provided in a digital subscriber line (DSL) system).

In the last 10 years, the existing telephone company infrastructure system (hereinafter the "Telco System") has been utilized to deliver content to users. DSL systems have been made available to provide high speed internet access to consumers. The Telco System has inherent bandwidth limitations in the amount of data that can be delivered over the copper paths prevalent in the system. These limitations have limited the effectiveness of using the Telco System to deliver high bandwidth content over the existing system. With the advent of advanced codec technology, the Telco System is now a viable delivery system for standard definition and high definition video and audio services. As a practical matter, other delivery systems (satellite for example) are not as constrained in terms of bandwidth. Further consumer applications that necessitate even more bandwidth, for example watching and recording different channels, have made the Telco System less desirable overall as a delivery mechanism.

SUMMARY

In one aspect, a method is provided for delivering television programming to a subscriber that includes receiving one or more channels of program content, and encoding each channel a plurality of times, each time at a different rate producing multiple rate encoded signals for each channel. The method further includes transmitting the multiple rate encoded signals to a central office over a network, determining an available bandwidth of a downstream link to a subscriber and a current bit rate available for transmission to the subscriber. The method further includes selecting a best available bit rate from the multiple rate encoded signals for a requested channel and transmitting the selected rate encoded signal to the subscriber.

Aspects of the invention can include one or more of the following features. The step of determining a current bit rate available for transmission to the subscriber can include determining one or more additional signals that are to be transmitted to the subscriber and a combination of best available rate encoded signals for the one or more additional signals and the requested channel and combining the best available rate encoded signals in a stream for output to the subscriber. The step of encoding can include encoding each channel three times, at respective high, medium and low bit rates. The step of encoding can include encoding each channel at rates selected from the group of substantially 1.5 Mbps, 2 Mbps, 4 Mbps, 6 Mbps, 8.5 Mbps, and 12 Mbps. The step of transmitting the rate encoded signals to a central office can include streaming the rate encoded signals over an IP network where streaming can include multicasting the rate encoded signals for each channel to a plurality of central offices. The step of streaming can include streaming the rate encoded signals on a different IP multicast address.

In another implementation a method is provided for delivering television programming to a subscriber that includes receiving one or more channels of program content, encode each channel a plurality of times, each time at a different rate producing a multiple rate encoded signals for each channel and transmit the multiple rate encoded signals to a central office over a network for distribution to individual subscribers.

In another implementation, a method is provided for delivering television programming to a subscriber including receiving one or more channels of program content, each channel encoded at a plurality of different rates thereby providing multiple rate encoded signals, determining an available bandwidth of a downstream link to a subscriber and a current bit rate available for transmission to the subscriber, selecting a best available bit rate from the multiple rate encoded signals for a requested channel and transmitting the selected rate encoded signal to the subscriber.

In another implementation, an apparatus is provided that includes a termination device including an input interface for receiving one or more channels of program content, each channel encoded at a plurality of different rates thereby providing multiple rate encoded signals, a buffer to buffer the multiple rate encoded signals and a bite rate engine. The bit rate engine is operable to determine an available bandwidth of a downstream link to a subscriber, determine a current bit rate available for transmission to the subscriber, and select a best available bit rate from the multiple rate encoded signals for a requested channel. The apparatus includes a multiplexer operable to combine selected signals for the subscriber and an output interface for transmitting the combined signal to the subscriber.

Aspects of the invention can include one or more of the following features. The apparatus can include a rule set including priority rules for use in determining a best available bit rate from the multiple bit rate encoded signals. The apparatus can include a user bit rate usage database including data indicating a current bit available for transmission to the subscriber.

Implementations can include one or more of the following advantages. A delivery system is provided for offering Telco operators an ability to use there existing, advanced network to offer high quality video and audio services in an optimal manner without compromising their inherent bandwidth constraints. The delivery system provided maximizes the bandwidth available to the consumer (e.g., to the home) based upon the bit rates consumed by each television subscriber in the consumer environment. Unlike a conventional broadcast system that broadcasts all channels at a consistent rate, the delivery system proposed will selectively deliver different rate content to the consumer. In the proposed delivery system, a central distribution location will broadcast content at a plurality of fixed rates to local central office distribution centers. The central office distribution centers are responsible for understanding specific consumer need, and selectively transmitting particular rate content to the individual consumer, and in one implementation, at a highest bit rate based on available bandwidth to the consumer.

In the proposed delivery system, the end subscriber will be able to view at any point in time the highest quality channel of data based upon their current bit rate capacity. In one implementation it was found that statistically, approximately 80% of the subscribers to the delivery system will be viewing the best quality channel available all of the time, the quality level being comparable to or better than conventional satellite and cable delivery systems.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
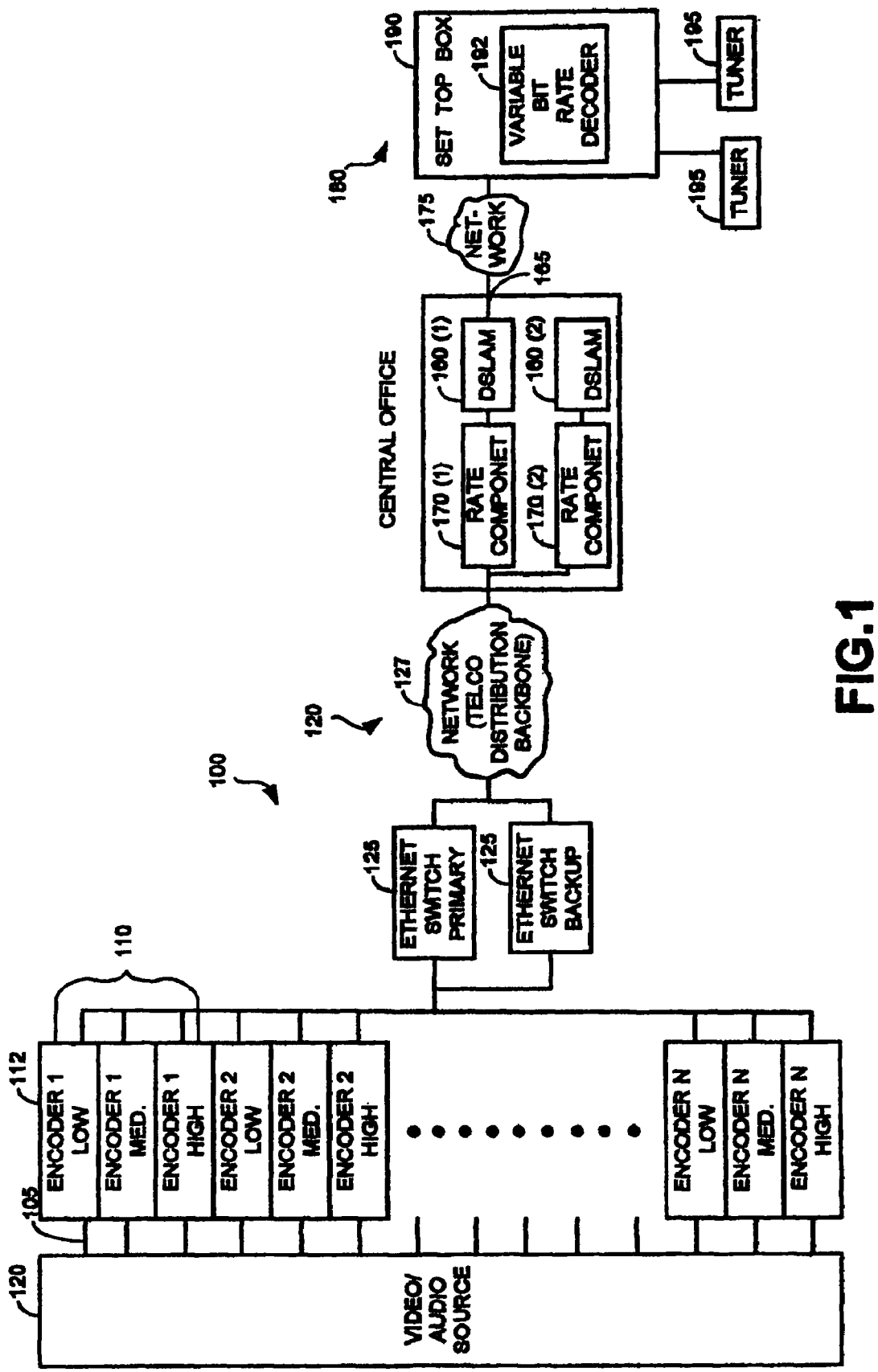
FIG. 1 is a block diagram of a content delivery system.

FIG. 1 shows a content delivery system 100 in which multiple encoders sets 110(1)-110(n) are connected to video/audio (video, audio, or both) sources 120. Each encoder set 110 includes one or more individual encoders 112(1)-112(n).

Encoders 112(1)-112(n) can be, for example, audio or video encoders that receive and encode input signals 105(1)-105(n) for transmission. Received content (which is subsequently encoded for delivery) can be of the form of television signals representing broadcast channels (e.g., standard or high definition), channel guides, live broadcast feeds, or other content. Encoders 112(1)-112(n) can support various encoding protocols including MPEG-2, H264 and VC-1 codec standards. Encoders 112(1)-112(n) typically can encode and transmit data at multiple bitrates. The bitrate an encoder uses to encode a signal can be varied based on, for example, the complexity of the signal, the available bandwidth in an output channel, or the quality desired or required for the encoded signal. In one implementation, each encoder 112 in a set of encoders 110 encodes the same video/audio/data content at a different constant (or capped) bit rate. For example, in one implementation each encoder set 110 includes three encoders 112 encoding a same received input signal 105 at rates set at 1.5 Mbps (megabits per second), 2.5 Mbps, and 4.0 Mbps for use, for example, with standard definition television signals. For high definition television signals, other bit rate combinations can be used (e.g., 6 Mbps, 8.5 Mbps and 12 Mbps). Other encoding rates can be selected and other numbers of encoders 112 can be included in each encoder set 110. The purpose for the duplicative content encoding will be discussed in greater detail below.

Each encoder 112 receives an input signal 105 (e.g., uncompressed analog or digital audio, video, or data), encodes the input signal 105 using an encoding unit (not shown), and transmits an encoded data message using a transmitter (not shown). The data message can be encoded with a fixed or variable bitrate and can be, for example, a stream of data or a series of discrete packets of data.

As discussed above, plural encoders 112 can be included in each encoder set 110. In one implementation, the bit rates selected for each encoder and combination of bit rates available for a given channel can be determined based on a number of criteria including a content provider's requirement for minimal bit rate, business needs of a service provider, network capability of the service provider and/or other criteria. These criteria may lead a service provider (i.e., the entity providing the delivery system) to define different combinations of bit rate options per channel as well as different numbers of bit rate optional channels. In the implementation described above, plural encoders 112 are contemplated for each channel. Optionally, only a single encoder may be used. Additionally, it should be noted that an encoder set can encode the same channel multiple times on the same physical platform or on separate platforms.

Encoders 112(1)-112(n) transmit encoded data over one or more networks 120(1)-120(n) (only one is shown) to one or more central offices 150(1)-150(n) (again, for the purposes of clarity, only one is shown). In one implementation, each encoder 112(1)-112(n) streams an individual encoded signal over a different internet protocol IP multicast destination address. In this implementation, destination addresses are associated with a given central office 150, so that multiple copies (encoded at different rates) of the audio/video content are delivered to a given central office 150 location. As one of ordinary skill in the art would recognize, streaming to multiple destination addresses (i.e., multicast) is one means of accomplishing the delivery of the encoded content to multiple destinations. Other means including subscription delivery protocols or systems can be used.

Networks 120(1)-120(n) can be internet protocol (IP) networks, other packet switched communication networks or other communication networks. In the content delivery system 100 shown, each encoder 112 communicates with an Ethernet switch 125 that acts as a gateway to a distribution backbone 127 of a network (e.g., distribution backbone of a Telco System) that in turn is coupled to one or more central offices 150. In the implementation shown, redundant switches 125(1) and 125(2) are used to ensure fault tolerant delivery. Alternatively, other communication networks including wide area networks, local area networks, public and private networks or combinations of these can be used to deliver the rate encoded data to the central office(s) 150. In other implementations, each encoder may communicate with a multiplexer that is used to combine the encoded data streams into a single output stream, which can be a constant bit rate stream. The single output stream can then be delivered to the respective destination. A demultiplexer can be included at each destination that is used to separate the individual streams for further processing (e.g., distribution to individual subscribers).

Central office 150 includes one or more termination units. In the implementation shown, central office 150 includes two digital subscriber line access multiplexers (DSLAMs) 160 and a rate component 170). In the implementation shown, a redundant set of DSLAMs 160 and rate components 170 are provided at a central office 150.

DSLAM 160 is a network device at central office 150 that receives signals from multiple customer Digital Subscriber Line (DSL) connections and puts the signals on a high-speed backbone line (e.g., backbone 127) using multiplexing techniques. In the implementation shown, a DSLAM provides termination (i.e., acts as a termination device) at the central office. Other forms of termination devices are possible including optical line termination devices (e.g., for a passive optical network), cable modem termination devices, and the like.

Rate component 170 is operable to identify usage of a specific subscriber (e.g., customer 180) with respect to bit rate consumption and for transmitting (via the termination device) the encoded channel(s) to subscribers based on a current availability of bandwidth. As discussed above, typically the link between the central office 150 and the subscriber has a capacity limit, such limit supporting all of the demands for content in a given subscriber environment. For example, a subscriber may have multiple television sets, including one or more tuners (or virtual tuners, e.g., each being associated with a destination IP address), each of which may be operated and produce a request for content to be delivered from the central office 150. The rate component 170 manages demand (e.g., the numbers of tuners requesting content) and allocated bandwidth (e.g., the subscriber downlink bandwidth) and controls the selection and transmission of encoded channels to a given subscriber. In one implementation, rate component 170 will transmit a highest bit rate encoded channel available (assuming bandwidth to the subscriber is available). As bandwidth is consumed, for example to support multiple demands from a given subscriber, lower bit rate options may be selected for transmission. Rate component 170 manages the transitions between the selection of the various rate encoded signals of the same channel, in one implementation, in real-time. The details of the selection process used by the rate component 170 are discussed in more detail below. In the implementation shown, rate component 170 is in line with, and separate from, the termination device (e.g., DSLAM 160). In one implementation, rate component 170 (including hardware, software, engines, processes, firmware or combinations thereof) or portions thereof are included in the termination device.

Central office 150 is coupled to a plurality of customers 180 by a network 175. Network 175 can be of the form of a packet switched communication network that transfers IP packets addressed accordingly to a given subscriber. Network 175 can be wired (including wire or optical transmission paths), wireless or a combination of both. Network 175 can be a local area network, a wide area network, public network, private network or combinations of these. In the specific example shown, network 175 is provided using a conventional Telco system including loop and aggregation technology as required. Other network connections, i.e., non IP, are possible.

Customer 180 includes a receiver, such as set top box 190. Set top box 190 can include a demultiplexer (not shown) for demultiplexing the received rate encoded signals into channels and one or more decoders 192(1)-192(n) for decoding the rate encoded signal channels received from the central office 150. In one implementation, the receiver includes a variable bit rate decoder that is capable of decoding the various different bit rate signals that are delivered from the central office. Alternatively, plural decoders can be used to decode the different encoded bit rate signals.

Figure 2:
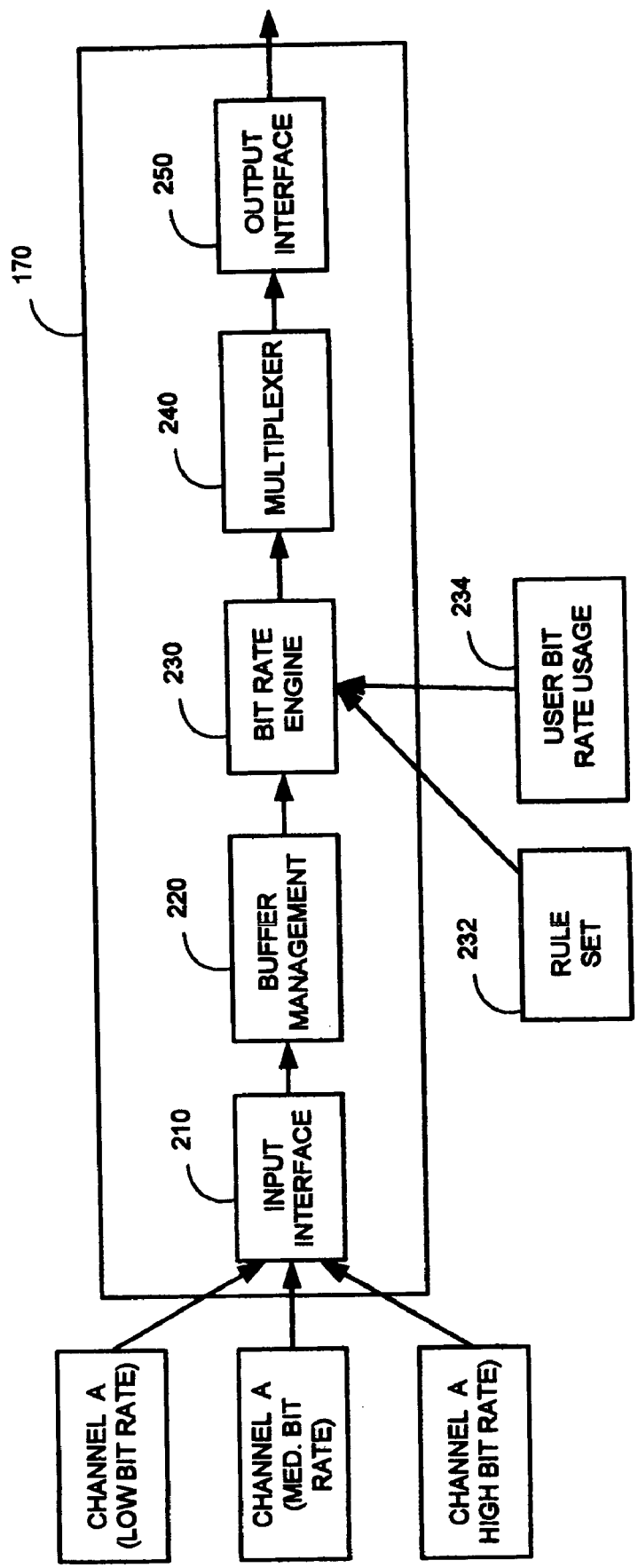
FIG. 2 is a block diagram of a rate component of the delivery system.

FIG. 2 shows an block diagram of rate component 170 of FIG. 1. Rate component 170 includes an input interface 210, buffer 220, bit rate engine 230, multiplexer 240 and output interface 250.

Input interface 210 is a module that is operable to receive the multiple input channels over network 120. In one implementation, input interface is an IP input interface for receiving IP packets from an IP network. In the simplified implementation shown in FIG. 2, input interface 210 receives three encoded signals associated with a single source including a low, medium and high bit rate input signal. In this example, Channel A (Low Bit Rate) refers to an incoming channel from the central office that has been encoded at a low bit rate, also known as aggressive bit rate. Channel A (Med Bit Rate) refers to the incoming channel from the central office that is encoded at a medium bit rate, also known as average bit rate. Channel A (High Bit Rate) refers to the incoming channel from the central office that is encoded at a high bit rate, also known as non-aggressive bit rate. As discussed above, other numbers of input sources and other numbers and levels of rates can be used.

Buffer 220 is operable to for caching data received. In one implementation, buffer 220 caches a group of pictures, also known as a GOP of a given channel (e.g., of Channel A), and other channels on the network. Buffer 220 can be of the form of a circular buffer that operates to overwrite data on roll over. Depending on a decision made by bit rate engine 230, a portion of the data stored in the buffer 220 can be directed to the output of the rate component 170.

Bit rate engine 230 is operable to decide which bit rate of a requested channel to transmit to the output. The decision can be based upon the current use of the available downlink bandwidth (i.e., the bit rates used for signals currently being transmitted to an end subscriber's home) taking into account the subscriber's current usage and total available bandwidth (i.e., stored in a user bit rate usage database 234), as well as pre-defined business rules which are stored in a rule set 232 associated with the bit rate engine 230. The output of the bit rate engine 230 is a selected bit rate of a requested channel (e.g., Channel A). Once a decision is made, a selected source stream can be requested from the buffer 220 and passed to the multiplexer 240. Details of selection are discussed below.

Multiplexer 240 is operable to multiplex selected data (e.g., selected channels of data, each channel at a selected bit rate based decisions of the bit rate engine 230). In one implementation, multiplexer 240 multiplexes the output of the bit rate engine 230 with other streams. More specifically, multiplexer 240 is used to combine the selected encoded data streams (e.g., a selected Channel A stream, a selected Channel B stream, etc.) into a single output stream, which can be a constant bit rate stream. The single output stream can then be delivered to the respective destination, i.e., the subscriber. A demultiplexer can be included at each destination that is used to separate the individual streams for further processing (e.g., distribution to individual subscriber tuners).

Output interface 250 is operable to process the output stream from the multiplexer to facilitate transmission to the subscriber. In one implementation, output interface 250 is an IP output interface and is operable to encapsulate (e.g., package) the received output stream from the multiplexer 240 into an IP format and transmit the IP packets downstream (e.g., using DSLAM 160) over an IP network to the subscriber.

Figure 3:
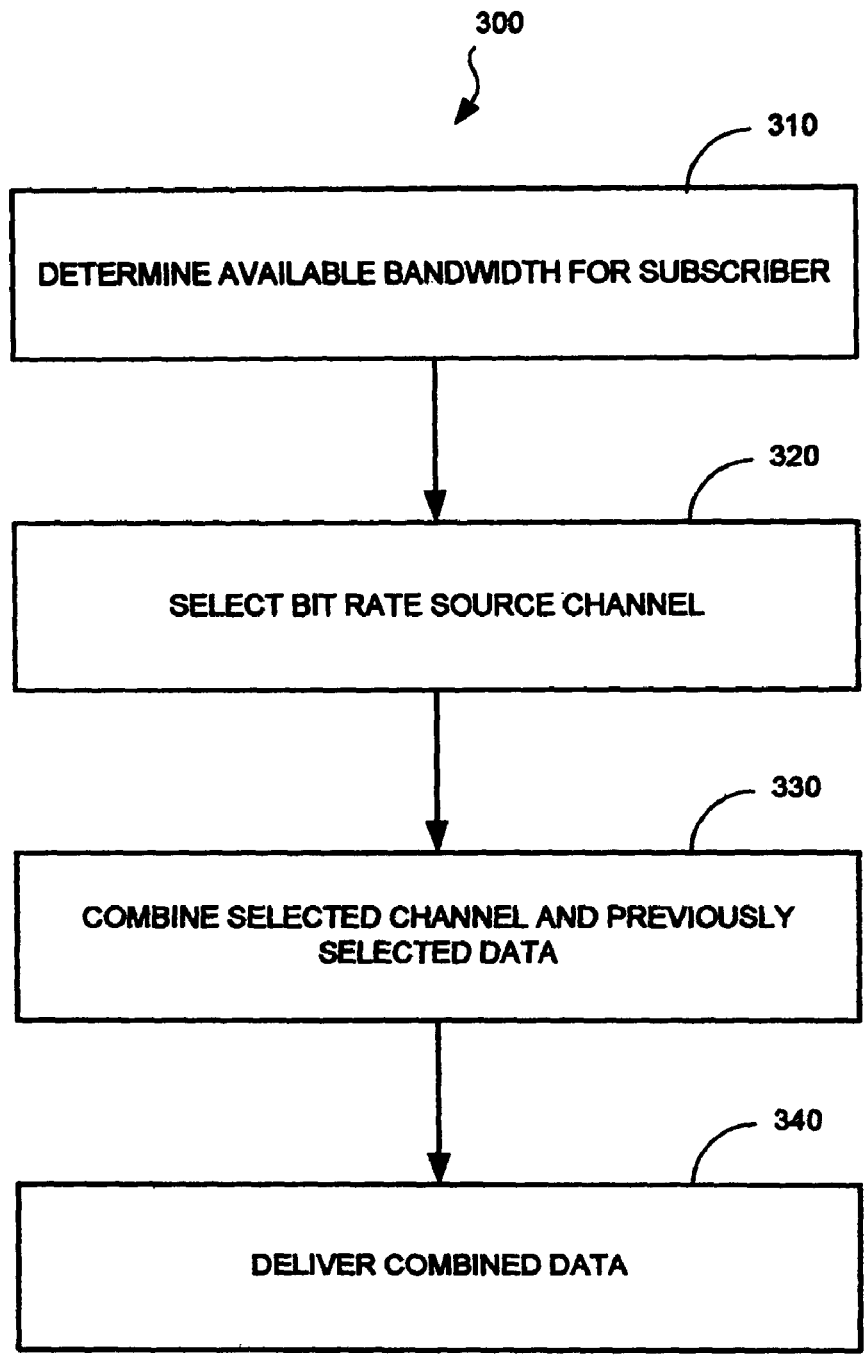
FIG. 3 is a flow diagram of a method for delivering content to a subscriber.

Referring now to FIG. 3, a method is described for use by the bit rate engine 230 in deciding which input stream to select for downstream transmission. A determination is made as to the level of the current available bandwidth (e.g., bit rate usage) per subscriber (310). Subscriber refers generally here, and throughout this document, as a single point of delivery of data from the central office. The subscriber may have plural devices (e.g., tuners) that are to receive the data and display/play/interact with the content. In one implementation, a subscriber has a plurality of tuners (or virtual tuners associated with an IP address) that request and receive specific data (e.g., a television channel delivered at a particular bit rate). Each tuner may be associated with a receiver which receives the data stream from the central office. Alternatively, each tuner may itself include a receiver. In one implementation the available bandwidth per subscriber is fixed. Alternatively, the available bandwidth per subscriber or for a individual subscriber can vary or be dynamically or otherwise adjusted. For purposes of clarity, only a fixed allocation system is discussed below.

Once the available bandwidth is determined, and based upon the current available bandwidth per subscriber, a decision is made which source channel to select (e.g., which of the different bit rate encoded versions of the same source channel) 320. In one implementation, the rate component 170 offers/provides the source channel with the highest bit rate that does not exceed the overall bit rate available per subscriber. As an example, if a subscriber has access to 10 Mbps, and currently 3 Mbps are in use (due to other previous selections), when a channel is requested, the bit rate engine will select the channel with the highest bit rate that does not exceed the available bit rate (e.g., 7 Mbps).

Thereafter, the selected channel and previously selected data are combined 330 (e.g., by multiplexer 240) and delivered 340 (e.g., through the termination device) to the subscriber. In one implementation, the decision as to what rate data is delivered is a dynamic, in that the available bandwidth can change over the course of time (in either fixed or dynamic allocation implementations). As the available bandwidth changes or in conjunction with periodic or otherwise checks, the decision process as to what rate data is delivered to a subscriber can be re-assessed, resulting in a different rate selection, and necessarily, delivery of different rate data to the subscriber. In the example given above with a 10 Mbps subscriber maximum rate, at a subsequent time, the subscriber may cancel or otherwise designate that the initial 3 Mbps, data is no longer required. At this time, a determination can be made as to whether higher rate data is available to deliver based on previous requests (e.g., previously 6 k Mbps data may have been selected, where 8 Mbps was available due to the 7 Mbps available limitation, and once the available bandwidth limitation was lifted, the higher rate data can then be selected). If available, the higher rate data can be delivered to the subscriber.

As one skilled in the art would recognize, as the total available bandwidth to a given subscriber fills, conflicts may result requiring bit rate engine 230 to prioritize or otherwise decide what combination of requested information is delivered. Ideally, the highest available bit rate data is delivered to the subscriber. When bandwidth limitations prevent the delivery of the highest rates, then one or more priority schemes (e.g., embodied in rules stored in rule set 232) can be used to determine an appropriate combination of rate data to deliver to the subscriber. In one implementation, based on business reasons, operators may decide to prioritize various services. Rule set 232 can include a configuration of business rules that define the priorities for conflict situations. Examples of business rules that can be considered include: priority between high definition and standard definition channels; priority between various content, for example, channel A may have a higher priority than channel B; priority between live broadcast channels and on-demand channels; priority between a channel being recorded by the end user or viewed by the end user; and/or priority based on quality of service purchased by the end user. Other considerations can be applied. In one implementation, the bit rate engine offers the highest bit rate channel based on the defined priorities that does not exceed the overall bandwidth available on the network.

A number of embodiments of the invention have been described. Nevertheless, it will be understood that various modifications may be made without departing from the spirit and scope of the invention. The invention of portions thereof can be implemented in hardware, software, firmware or the like and include discrete or integrated components. Though reference has been made to particular storage structures, termination devices, networks, network components, telephone networks, content and the like, the principals of the present invention are applicable to other structures, devices, networks, content, components and the like. Nothing in this disclosure should be construed as limiting with respect to the applicability of the invention to any particular hardware or other implementation.

Accordingly, other embodiments are within the scope of the following claims.

What is claimed is:

1. A method for delivering television programming to a subscriber comprising:
   receiving one or more channels of program content;
   encoding each channel a plurality of times, each time at a different rate producing multiple rate encoded signals for each channel;
   transmitting the multiple rate encoded signals to a central office over a network;
   determining an available bandwidth of a downstream link from the central office to a subscriber that is requesting a given channel;
   determining a current bit rate available for transmission to the subscriber;
   selecting, by the central office, a best available bit rate from the multiple rate encoded signals for a requested channel based on the determined available bandwidth and the current bit rate available; and
   transmitting, by the central office, the requested channel with the selected best available bit rate to the subscriber.

2. The method of claim 1 further comprising
   determining one or more additional channels that are to be transmitted to the subscriber;
   determining a combination of best available rate encoded signals for the one or more additional channels and the requested channel; and
   combining the best available rate encoded signals in a stream for output to the subscriber.

3. The method of claim 1 wherein the step of encoding includes encoding each channel three times, at respective high, medium and low bit rates.

4. The method of claim 3 wherein the step of encoding includes encoding each channel at rates selected from the group of substantially 1.5 Mbps, 2 Mbps, 4 Mbps, 6 Mbps, 8.5 Mbps, and 12 Mbps.

5. The method of claim 1 wherein the step of transmitting the multiple rate encoded signals to a central office includes streaming the multiple rate encoded signals over an IP network.

6. The method of claim 5 wherein the step of streaming includes multicasting the multiple rate encoded signals for each channel to a plurality of central offices.

7. The method of claim 6 wherein the step of streaming includes streaming the multiple rate encoded signals on a different IP multicast address.

8. A method for delivering television programming to a subscriber comprising;
   receiving one or more channels of program content;
   encoding each channel a plurality of times, each time at a different rate producing multiple rate encoded signals for each channel;
   transmitting the multiple rate encoded signals to a central office over a network for distribution to individual subscribers;

selecting, by the central office, a bit rate from the multiple rate encoded signals; and transmitting, by the central office, a channel with the selected bit rate to the subscriber.

9. The method of claim 8 wherein the step of encoding includes encoding each channel three times, at respective high, medium and low bit rates.

10. The method of claim 9 wherein the step of encoding includes encoding each channel at rates selected from a group of substantially 1.5 Mbps, 2 Mbps, 4 Mbps, 6 Mbps, 8.5 Mbps or 12 Mbps.

11. The method of claim 8 wherein the step of transmitting the multiple rate encoded signals to a central office includes streaming the rate encoded signals over an IP network.

12. The method of claim 11 wherein the step of streaming includes multicasting the multiple rate encoded signals for each channel to a plurality of central offices.

13. The method of claim 12 wherein the step of streaming includes streaming the multiple rate encoded signals on a different IP multicast address.

14. A method for delivering television programming to a subscriber comprising:

receiving a channel of program content, the channel encoded at a plurality of different rates thereby providing multiple rate encoded signals corresponding to a given channel;

determining an available bandwidth of a downstream link to a subscriber;

determining a current bit rate available for transmission to the subscriber;

selecting, by a central office, a best available bit rate from the multiple rate encoded signals for a requested channel based on the available bandwidth and the current bit rate available; and transmitting, by the central office, the requested channel with the selected best available bit rate to the subscriber.

15. The method of claim 14 further comprising determining one or more additional channels that are to be transmitted to the subscriber;

determining a combination of best available rate encoded signals for the one or more additional channel and the requested channel; and combining the best available rate encoded signals in a stream for output to the subscriber.

16. The method of claim 14 further comprising receiving a channel selection from the subscriber.

17. The method of claim 16 further comprising receiving a plurality of channel selections from the subscriber including the requested channel and the one or more additional channels.

18. An apparatus comprising:
a termination device including:
an input interface for receiving a plurality of channels of program content, each channel encoded at a plurality of different rates thereby providing multiple rate encoded signals corresponding to a given channel;
a buffer to buffer the multiple rate encoded signals;
a bit rate engine operable to determine an available bandwidth of a downstream link to a subscriber, determine a current bit rate available for transmission to the subscriber, and select a best available bit rate from the multiple rate encoded signals for a requested channel;
a multiplexer operable to combine the requested channel with the selected best available bit rate and at least one other channel in the plurality of channels; and
an output interface for transmitting the combined channels from a central office to the subscriber.

19. The apparatus of claim 18 further including a rule set including priority rules for use in determining a best available bit rate from the multiple bit rate encoded signals.

20. The apparatus of claim 18 further including a user bit rate usage database including data indicating a current bit rate available for transmission to the subscriber.

\* \* \* \* \*